(12) United States Patent
Hoffmann

(10) Patent No.: US 8,381,914 B2
(45) Date of Patent: Feb. 26, 2013

(54) METHOD FOR RECOVERING SILICON FROM SAWING WASTE

(75) Inventor: Patrik Hoffmann, Epalinges (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 462 days.

(21) Appl. No.: 12/808,777

(22) PCT Filed: Dec. 4, 2008

(86) PCT No.: PCT/IB2008/003330
§ 371 (c)(1),
(2), (4) Date: Jul. 21, 2010

(87) PCT Pub. No.: WO2009/081245
PCT Pub. Date: Jul. 2, 2009

(65) Prior Publication Data
US 2010/0278707 A1    Nov. 4, 2010

(30) Foreign Application Priority Data
Dec. 19, 2007 (CH) .................................. 1965/07

(51) Int. Cl.
*B03D 1/02* (2006.01)
(52) U.S. Cl. ....... 209/164; 209/12.1; 209/166; 423/348; 423/349
(58) Field of Classification Search .............. 209/12.1, 209/164, 166; 423/348, 349
See application file for complete search history.

(56) References Cited

U.S. PATENT DOCUMENTS

| 4,293,099 A * | 10/1981 | Parekh et al. ................... 241/16 |
| 6,780,665 B2 * | 8/2004 | Billiet et al. ................... 438/57 |
| 7,223,344 B2 | 5/2007 | Zavattari et al. |
| 2003/0041895 A1 | 3/2003 | Billiet et al. |

FOREIGN PATENT DOCUMENTS

| CH | 692 138 | 2/2002 |
| DE | 3343406 A1 | 6/1985 |
| EP | 1561557 A1 | 8/2005 |
| EP | 1 726 364 | 11/2006 |
| JP | 63-49291 | 3/1988 |
| JP | 8039430 A | 2/1996 |
| JP | 10-323675 | 12/1998 |
| JP | 2004-223321 | 8/2004 |
| JP | 2004-261708 | 9/2004 |
| WO | 02/40407 A1 | 5/2002 |

OTHER PUBLICATIONS

International Search Report dated May 4, 2009, from corresponding PCT application.

* cited by examiner

*Primary Examiner* — Thomas M Lithgow
(74) *Attorney, Agent, or Firm* — Young & Thompson

(57) ABSTRACT

A method for separating and recovering silicon debris from sawing waste is characterized in that it includes the following steps: —treating the sawing waste so as to deoxidize the silicon debris in a manner that reduces their surface energy, —applying to the sawing waste thus treated a flotation method using a flotation liquid and a nonoxidizing flotation gas, and —recovering the silicon debris at the surface of the flotation liquid.

20 Claims, 3 Drawing Sheets

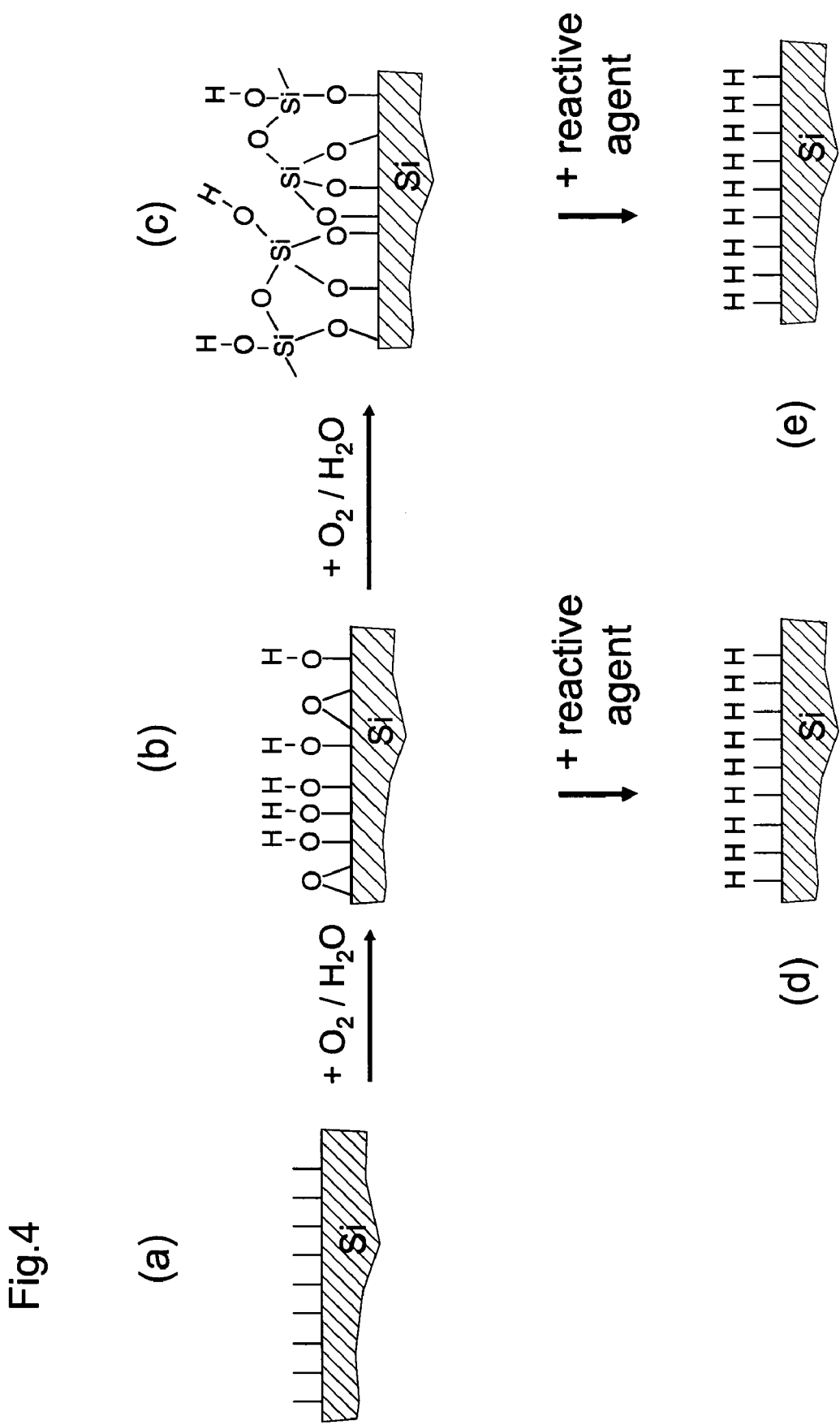

METHOD FOR RECOVERING SILICON FROM SAWING WASTE

Figure 1:
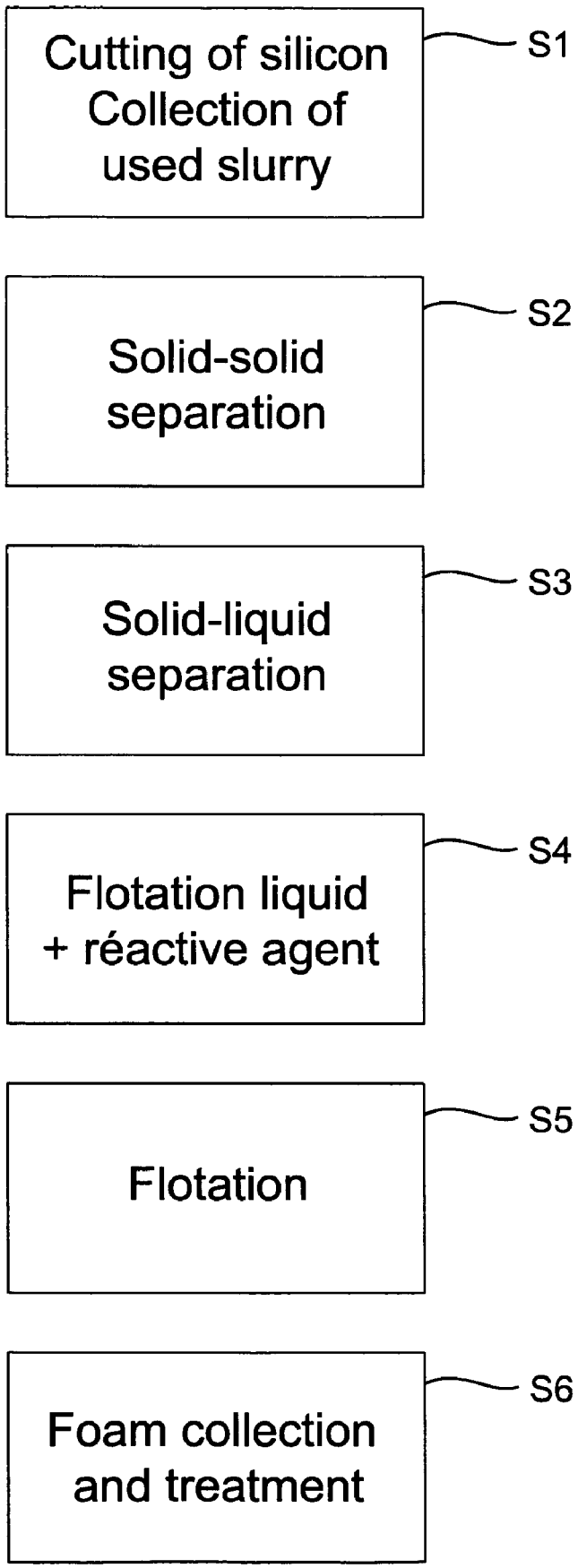

The present invention is applicable to the sawing industry, and refers more particularly to the sawing of silicon ingots for the production of silicon wafers notably used in semiconductor technology, such as in electronic or photovoltaic applications.

The most common technique of silicon sawing is wire sawing. This consists in pressing a silicon ingot against parallel metal wires which are guided by rollers and which perform a continuous motion or a to-and-fro motion. The metal wires are coated with a slurry consisting of a suspension of abrasive particles in a coolant and dispersion liquid. The abrasive particles consist of silicon carbide (SiC), corundum, or diamond, for example. The liquid is a silicon oil or polyethylene glycol, for example. The sawing yields a large amount of silicon dust from the ingot. This dust mixes to the slurry with metal dust and ions stemming from the sawing wires. The silicon dust may amount to as much as 50% of the ingot's total mass. It thus represents an important economic loss.

In Swiss patent CH 692 138, there is described a method for recovering and recycling part of the used slurry. This method includes two separation steps, namely, a first step where the abrasive particles are separated from the liquid containing the sawing debris, that is, the silicon dust stemming from the ingot and the metal dust stemming from the wires, and a second step, where the liquid is separated from the sawing debris. These two steps are realized by centrifugation, for instance. The purified liquid produced in the second step is mixed with the abrasive particles recovered at the end of the first step in order to reconstitute a slurry. The sawing debris recovered at the end of the second step are stored in a waste container.

The present invention aims at providing a method that allows the silicon dust produced by sawing to be separated and recovered for recycling.

To this end, there is provided a method for separating and recovering silicon debris from sawing waste, characterized in that it comprises the following steps:
  treating the sawing waste so as to deoxidize the silicon debris in a manner that reduces their surface energy,
  applying to the sawing waste thus treated a flotation method using a flotation liquid and a nonoxidizing flotation gas, and
  recovering the silicon debris at the surface of the flotation liquid.

Deoxidation of the silicon debris can be achieved by chemical reaction with a reactive agent. The reactive agent is for example an acid, such as hydrofluoric acid, or a fluoride, such as sodium fluoride (NaF) or ammonium fluoride ($NH_4F$). The flotation gas preferably is an inert gas. The flotation liquid may be an aqueous liquid.

In a particular embodiment, the sawing waste consists of used slurry comprising abrasive particles. These abrasive particles have a surface energy higher than that of the flotation liquid. The abrasive particles consist of silicon carbide or corundum, for example.

Prior to said treatment step, a step of solid-solid separation may be provided in order to separate part of the abrasive particles from the sawing waste. A step of solid-liquid separation may also be provided prior to said treatment step and after said solid-solid separation step, in order to separate the rest of the solid phase from the liquid phase of the used slurry.

Advantageously, the sawing waste stems from a silicon sawing step that is realized in a nonoxidizing atmosphere.

Figure 2:
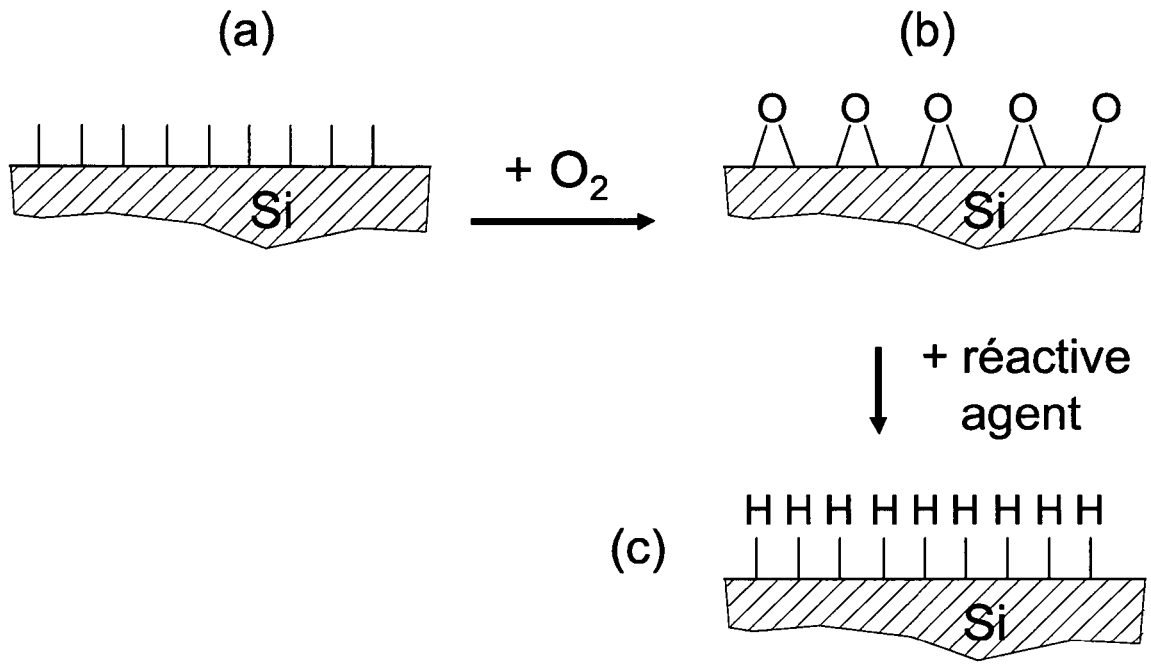
Figure 3:
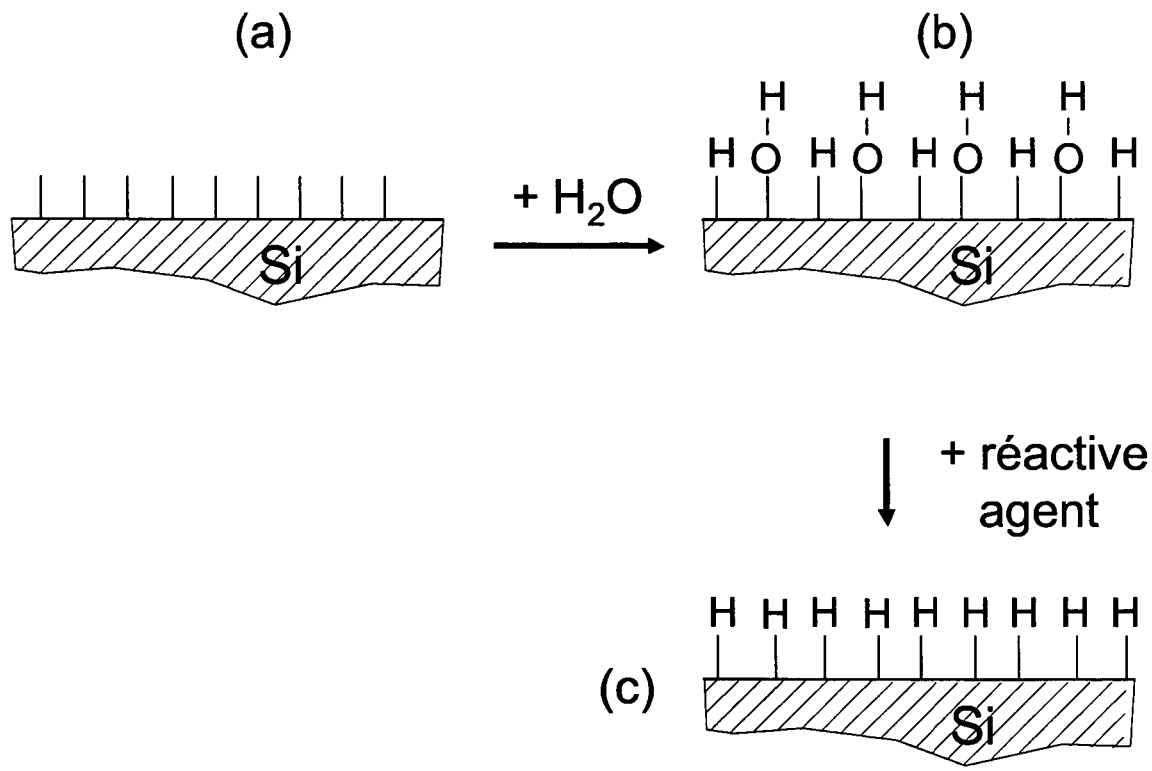

Other characteristics and advantages of the present invention will become apparent when reading the following detailed description while referring to the annexed drawings where:

FIG. 1 is a block-diagram of a silicon debris separation and recovery method according to a preferred embodiment of the invention;

FIGS. 2 to 4 schematically show chemical reactions occurring with the silicon debris.

Referring to FIG. 1, a method for separating and recovering silicon debris according to a preferred embodiment of the invention includes steps S1 to S6.

In step S1, a piece of silicon, such as an ingot, is cut or sliced in a wire sawing machine. The sawing wires are made of metal, typically steel, and are coated with a slurry consisting of a suspension of abrasive particles in a coolant liquid dispersing the particles. The abrasive particles are made of a hard material having a high surface energy, such as silicon carbide (SiC) or corundum (crystalline form of aluminum oxide). The coolant and dispersion liquid is silicon oil or polyethylene glycol, for instance. During the sawing, the silicon debris stemming from the ingot, the metal debris stemming from the sawing wires, and various contaminants (ions or soluble molecules) stemming from the wires, their coating, or from other parts of the machine become mixed with the slurry. The silicon and metal debris are in the form of particles or dust. The used slurry dropping from the sawing zone is collected in a tank as described in patent CH 692 138.

In step S2, a solid-solid separation in liquid phase is performed, for example by centrifugation, in order to separate the large, heavy particles, having an average size above 5 μm, from the rest of the used slurry. The particles recovered in this step are essentially abrasive particles. It will be possible to reintroduce them into the sawing process.

In step S3 a solid-liquid separation is carried out, for example by centrifugation, in order to separate from the liquid of the used slurry the remaining solid phase, consisting essentially of small, light particles, with an average size below 5 μm. The solid mixture recovered in this step essentially contains silicon and metal particles as well as fine (broken) abrasive particles. It will be possible to also reintroduce the separated liquid into the sawing process in order to reconstitute a slurry with the abrasive particles recovered.

Steps S2 and S3 correspond to the separation steps described in the patent CH 692 138.

When silicon is freshly cut or broken, its surface exhibits dangling bonds corresponding to unsaturated bonding sites or molecular orbitals occupied by only one electron. These sites or orbitals are highly reactive chemically, particularly in the presence of oxygen ($O_2$) or water ($H_2O$). FIGS. 2(a), 3(a) and 4(a) schematically show a piece of silicon freshly cut with dangling bonds shown by strokes at its surface. When in contact with oxygen alone, the silicon generally becomes oxidized in the manner illustrated by FIG. 2(b). When in contact with water alone, the silicon generally becomes oxidized in the manner shown in FIG. 3(b). When in contact with oxygen and water, it generally becomes oxidized first in the manner shown in FIG. 4(b) and thereafter in the manner shown in FIG. 4(c). The structure represented in FIG. 4(c) is that of silicon covered with a layer of native silicon oxide. As can be seen, oxygen atoms diffuse into the silicon and thus penetrate between silicon atoms. In addition, Si:OH terminations are formed and confer to this oxidized silicon a high surface energy, i.e. a large wettability. The thickness of the layer of native silicon oxide is of the order of a nanometer.

In step S4 of the method according to the invention, the solid mixture obtained in step S3, while still wet, is suspended in a liquid called flotation liquid. The amount of said liquid is so selected that the viscosity of the mixture obtained is low enough, typically below 50 mPa·s, preferably below 10 mPa·s, for instance comprised between 1 and 10 mPa·s. The mixing may be achieved with the aid of any appropriate solid-liquid mixer, and the dispersion of the solid particles in the liquid may be accelerated or improved by sonication. A reactive agent is added to this mixture or to the solid mixture prior to dilution by the flotation liquid, in order to dissolve at least in part the oxide layers of the silicon particles and produce Si:H terminations at the surface of these particles. FIGS. 2(c), 3(c), 4(d) and 4(e) show the final structure obtained by the reaction of this reactive agent on the oxidized silicon. It can be seen that the surface of the silicon particles is cleared from its oxide and becomes terminated with hydrogen atoms linked to the silicon by covalent bonds. This form of silicon that is illustrated in FIGS. 2(c), 3(c), 4(d) and 4(e) is stable and has a low surface energy, in other words a low wettability. The action of the reactive agent on silicon particles that would not yet have been oxidized (FIGS. 2(a), 3(a) and 4(a)) would also lead to the formation of Si:H terminations. Contrary to the surfactants generally used in separation methods for modifying the surface energy of determined particles, and consisting of amphiphiles with long chains of hydrocarbons (alkyl chains) which become attached to the particles by ionic bonding, the Si:H terminations do not modify the chemical and mechanical properties of the silicon, or only negligibly.

The flotation liquid typically is an aqueous liquid, that is, water or an aqueous solution, preferably deoxygenated.

The reactive agent is for example an acid, preferably hydrofluoric acid (HF). This acid has indeed a particular selectivity toward silicon oxide, in that it will attack the silicon oxide very rapidly, but will attack the nonoxidized part of silicon only very slowly, or hardly at all. However, the use of another acid than hydrofluoric acid is not excluded by the present invention.

Fluorides such as sodium fluoride (NaF) or ammonium fluoride ($NH_4F$), more precisely water-soluble fluorides, are another example of reactive agent. Ammonium fluoride is advantageous in the sense that it will allow the solution it forms with the flotation liquid to keep a basic pH value, thus avoiding the formation of hydrofluoric acid vapors. The fluorides react with the water of the flotation liquid to form hydrofluoric acid which will react with the silicon oxide to form Si:H terminations as indicated hereinabove.

In a general way, any reactive agent may be suitable that is capable of eliminating the oxide layer from the silicon and conferring a low surface energy to the silicon.

The next step, S5, consists in separating the silicon particles from the other particles by a method of flotation in the flotation liquid. Flotation is a technique of separation of particles based on the difference in their surface energies. In a liquid containing bubbles of a gas, called flotation gas, that rise to the surface, the particles having a low surface energy, i.e. a surface energy lower than that of the liquid, will become attached to the gas bubbles while the particles having a high surface energy, i.e. a surface energy higher than that of the liquid, will stay suspended in the liquid and will sediment. The particles having a low surface energy thus form at the surface of the liquid a foam that can be recovered and dried. Several methods of flotation can be found in the literature, particularly improved methods such as carrier flotation, oil-assisted flotation, electroflotation, or dissolved-air flotation. Step S5 can be realized with any of these methods. However, as the flotation gas a non-oxidizing gas or gas mixture is used, i.e., a gas that will not oxidize the surface of the silicon particles during the flotation. Preferably, the flotation gas used is an inert gas such as nitrogen ($N_2$), argon (Ar), or a mixture of the two, in order to guarantee absence of a chemical reaction between this gas and the silicon. One may also use a mixture of one of these inert gases with hydrogen ($H_2$). In this case, the hydrogen will be able to react with the silicon in order to fill up its surface with Si:H terminations.

In step S5, the mixing of the flotation liquid containing the silicon particles and the other particles with the flotation gas, which is in pressurized form, may be realized in different ways. One preferred embodiment of this mixing consists in pumping part of the flotation liquid into liquid-gas mixers and then remixing this gas-enriched part with the flotation liquid.

During flotation, the silicon particles rise to the surface with the gas bubbles and form a foam. The abrasive particles as well as the metal particles sediment or remain suspended. The contaminants in the form of ions or soluble molecules remain dissolved in the liquid.

The low surface energy of the silicon particles makes them hydrophobic. The larger surface energy of the abrasive and metal particles makes them hydrophilic or less hydrophobic than silicon. The Si:H terminations of the silicon particles in particular have a very pronounced hydrophobic character. Thus, the silicon may be readily separated from the other particles by flotation in an aqueous medium. However, the use of a nonaqueous flotation liquid is not excluded by the present invention.

In step S6, the foam is recovered and then dried. Silicon powder of high purity is thus obtained. This powder may be packaged in an inert atmosphere to be used in various applications. It may also be compressed, sintered or melted in a furnace and then cast in order to reconstitute ingots.

In the method described above, one can diminish the amount of reactive agent needed to deoxidize the silicon particles and lower their surface energy, by performing the sawing (step S1) in a nonoxidizing atmosphere, preferably inert (for instance, under argon or nitrogen), so as to limit oxidation of the silicon. Preferably, the other steps (S2 to S6) are also realized in a nonoxidizing or inert atmosphere.

In a variant of the invention, separation steps S2 and S3 are suppressed, and step S4 is applied directly to the used slurry. In this case, the flotation liquid may consist of the liquid phase of the slurry, i.e. for example polyethylene glycol, diluted or not in an aqueous liquid.

It will be noted that the present invention is applicable to other sawing techniques than wire sawing with abrasive slurry. The silicon cutting operation (step S1) may indeed be carried out with methods using a fixed abrasive, for instance wire sawing involving one or several diamond-lined metal wires, but also a sawing performed with a band saw or with an internal-diameter blade saw where the hardness of the cutting tool is once again obtained by injecting a hard material such as diamond. In these cases, an abrasive slurry generally is not used, but still a liquid is used that has the function of eliminating the heat and the silicon sawing dust created in the cutting zone. Steps S4 to S6 of the method may then be implemented for separating the silicon from undesirable debris deriving from the wear of the cutting tool.

The invention claimed is:

1. Method for separating and recovering silicon debris from sawing waste, characterized in that it comprises the following steps:
    treating the sawing waste so as to deoxidize the silicon debris in a manner that reduces their surface energy,
    applying to the sawing waste thus treated a flotation method using a flotation liquid and a nonoxidizing flotation gas, and recovering the silicon debris at the surface of the flotation liquid.

2. Method according to claim 1, characterized in that the deoxidation of the silicon debris is achieved by a chemical reaction with a reactive agent.

3. Method according to claim 2, characterized in that the reactive agent is an acid.

4. Method according to claim 3, characterized in that the reactive agent is hydrofluoric acid.

5. Method according to claim 2, characterized in that the reactive agent is a fluoride.

6. Method according to claim 5, characterized in that the reactive agent is sodium fluoride or ammonium fluoride.

7. Method according to claim 1, characterized in that the flotation gas is an inert gas.

8. Method according to claim 1, characterized in that the flotation liquid is an aqueous liquid.

9. Method according to claim 1, characterized in that the sawing waste is used slurry comprising abrasive particles.

10. Method according to claim 9, characterized in that the abrasive particles have a surface energy higher than that of the flotation liquid.

11. Method according to claim 9, characterized in that the abrasive particles consist of silicon carbide or corundum.

12. Method according to claim 9, characterized by further comprising, prior to said treatment step, a step of solid-solid separation, to separate part of the abrasive particles from the sawing waste.

13. Method according to claim 12, characterized by further comprising, prior to said treatment step and after said solid-solid separation step, a step of solid-liquid separation, to separate the rest of the solid phase from the liquid phase of the used slurry.

14. Method according to claim 1, characterized in that the sawing waste stems from a step of silicon sawing realized in a nonoxidizing atmosphere.

15. Method according to claim 2, characterized in that the flotation gas is an inert gas.

16. Method according to claim 3, characterized in that the flotation gas is an inert gas.

17. Method according to claim 4, characterized in that the flotation gas is an inert gas.

18. Method according to claim 5, characterized in that the flotation gas is an inert gas.

19. Method according to claim 6, characterized in that the flotation gas is an inert gas.

20. Method according to claim 2, characterized in that the flotation liquid is an aqueous liquid.

* * * * *

UNITED STATES PATENT AND TRADEMARK OFFICE
CERTIFICATE OF CORRECTION

PATENT NO. : 8,381,914 B2  Page 1 of 1
APPLICATION NO. : 12/808777
DATED : February 26, 2013
INVENTOR(S) : Patrik Hoffmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this
First Day of September, 2015

Michelle K. Lee
*Director of the United States Patent and Trademark Office*